United States Patent [19]

Watanabe et al.

[11] Patent Number: 4,931,523

[45] Date of Patent: Jun. 5, 1990

[54] PLASTIC LENS

[75] Inventors: Nobuhiro Watanabe, Matsudo; Teruo Sakagami, Nerima, both of Japan

[73] Assignee: Kureha Kagaku Kogyo Kabushiki Kaisha, Japan

[21] Appl. No.: 190,121

[22] Filed: May 4, 1988

[30] Foreign Application Priority Data

May 12, 1987 [JP] Japan .................. 62-113576

[51] Int. Cl.$^5$ ......................................... C08F 220/22
[52] U.S. Cl. .................................................. 526/292.3
[58] Field of Search ..................................... 526/292.3

[56] References Cited

U.S. PATENT DOCUMENTS 4,487,904 12/1984 Fukuda et al. ................... 526/301
4,578,445  3/1986 Sakagami et al. ............ 526/292.3

Primary Examiner—Joseph L. Schofer
Assistant Examiner—T. McDonald
Attorney, Agent, or Firm—Arnold, White & Durkee

[57] ABSTRACT

A plastic lens is made of a copolymer which has been obtained by copolymerizing 10–80 wt. % of a first monomer represented by the general formula (I) given below and 20–90 wt. % of a second monomer copolymerizable with the first monomer. General formula (I):

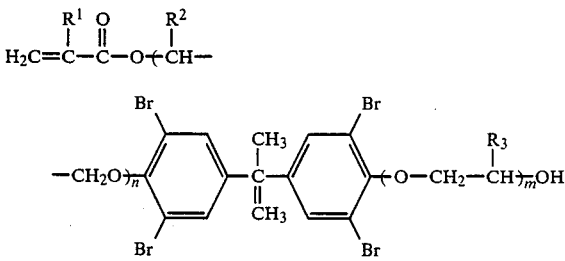

wherein $R^1$, $R^2$ and $R^3$ mean individually a hydrogen atom or methyl group, and n and m denote integers of 0–4 in total.

7 Claims, No Drawings

PLASTIC LENS

BACKGROUND OF THE INVENTION

(1) Field of the Invention:

This invention relates to plastic lenses, especially, to plastic lenses made of a brominated aromatic copolymer which has a high refractive index and is high in dyeability.

(2) Description of the Related Art:

Both spectacle lenses and contact lenses are generally used for the correction of vision. As spectacle lenses out of these lenses, plastic lenses made of a synthetic resin have found wide-spread utility for their useful advantages such as lightweights, easy machinability, stability and dyeability in addition to inorganic glass lenses.

A variety of characteristics are required for such plastic lenses. Among these, it is essential that the refractive index is high and the light dispersiveness is low. Namely, it is extremely preferred for a lens to have a high refractive index, since the high refractive index facilitates the designing of the lens to impart desired characteristics, and the so-called peripheral thickness of the lens can be reduced substantially and its weight reduction can also be achieved at the same time.

It is one advantage of plastic lenses over inorganic glass lenses that the plastic lenses have high dyeability, whereby optical characteristics suitable for various applications can be imparted to the plastic lenses. In spectacle lenses for example, the correction of vision is most important as their function. There is however recent tendency that spectacle lenses themselves are taken as a sort of fashion-related elements. The commercial value of spectacle lenses is declining so long as their function of visual correction is concerned merely. It has started taking the color tone and the like of lenses as important in order to make the lenses match a frame to be used. In order to meet this move, it is becoming important to apply dyeing to spectacle lenses so as to dye them in various colors. This is a major cause for the starting of use of plastic lenses in place of inorganic glass lenses. It is an indispensable property for plastic lenses to have dyeability when their practical utility is taken into consideration.

It is diethylene glycol bis(ally carbonate) (hereinafter called "CR-39") that is used most widely as a material for spectacle plastic lenses these days. The refractive index of this CR-39 is however as low as 1.50 ($n_D = 1.50$).

For the reasons mentioned above, a great deal of work is now under way on polymers or copolymers which may provide plastic lenses having a high refractive index. Some of such polymers or copolymers have already been used actually.

For example, dimethacrylate and diacrylate copolymers in which a nucleus halogen-substituted aromatic ring is bonded to a methacryloxy or acryloxy group via an alkylene glycol group are proposed in Japanese Patent Publication No. 14449/1983. Further, polymers of a urethanated (meth)acrylic monomer obtained by reacting a brominated aromatic monomer, which contains a hydroxyl group, with a polyfunctional isocyanate are proposed in Japanese Patent Laid-Open No. 51706/1985.

The polymers proposed in the above patent publications are satisfactory as far as their refractive indexes are concerned. They are however accompanied by a drawback that their dyeability is too low to dye them in practice. They therefore involves a problem that a substantial limitation is imposed on their application field upon providing them for actual applications.

SUMMARY OF THE INVENTION

As a result of an extensive investigation, the present inventors have found that copolymers making use of certain specific monomers have a high refractive index and also good dyeability, thereby leading to completion of the present invention.

The present invention provides a plastic lens having a high refractive index and good dyeability by using as its material a copolymer which has been obtained by copolymerizing a specific aromatic monomer containing bromine atoms with a monomer copolymerizable with the first-mentioned monomer.

In one aspect of this invention, there is thus provided a plastic lens made of a copolymer which has been obtained by copolymerizing 10–80 wt. % of a first monomer represented by the general formula (I) given below and 20–90 wt. % of a second monomer copolymerizable with the first monomer which may also be referred to as "monomer (I)".

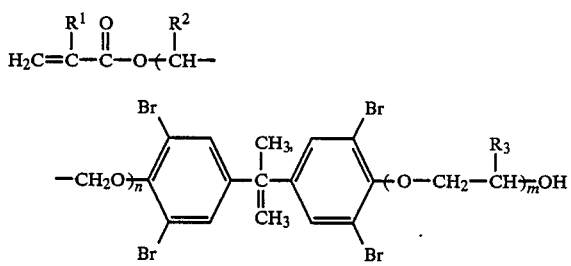

wherein $R^1$, $R^2$ and $R^3$ mean individually a hydrogen atom or methyl group, and n and m denote integers of 0–4 in total.

Since the plastic lens of this invention is made of the copolymer of the specific monomers, it has a high refractive index, for example, 1.58 or still higher and excellent dyeability. These excellent advantages may be attributed to the inclusion of the monomer of the general formula (I) in the copolymer which makes up the plastic resin.

DETAILED DESCRIPTION OF THE INVENTION AND PREFERRED EMBODIMENTS

The copolymer which makes up the plastic lens of this invention contains, as a principal component, the monomer (I) represented by the general formula (I), namely, an aromatic monomer containing bromine atoms.

Tetrabromobisphenol A which forms the skeletal structure in the general formula (I) is a material available at a relatively low cost. It is hence a valuable advantage of the present invention that the plastic lens of this invention can be obtained at a low cost. Comparing the present invention with the prior art techniques described above, there is a significant difference in that the plastic lens of Japanese Patent Publication No. 14449/1983 or Japanese Patent Laid-Open No. 51706/1985 uses a copolymer obtained by esterifying the terminals of tetrabromobisphenol A via an alkylene glycol or a polymer obtained by urethanating them with a polyfunctional isocyanate while the monomer of the general formula (I), the essential and principal component of the copolymer of the plastic lens of this invention, contains a free hydroxyl group in its molecular structure.

In monomers such as those referred to above, the moiety effective in imparting a high refractive index to the resultant polymer and copolymers is considered to be the brominated bisphenol moiety. In the techniques disclosed in the above patent publications, a relatively large substituent is bonded to the bisphenol moiety by esterification or urethanation. This substituent however does not contribute to the achievement of a high refractive index and moreover, has correspondingly caused to lower the concentration of brominated bisphenol skeletons which contribute to the achievement of a high refractive index. Since hydroxyl groups are lost by the above substitution, the resultant copolymers are extremely low in dyeability. In contrast, the monomer (I) in the present invention does not contain any large substituent and the concentration of bisphenol moieties is hence high. Moreover, it contains a free hydroxyl group. The resultant copolymer is therefore believed to have a high refractive index and excellent dyeability.

From the foregoing standpoint, it is more advantageous for the monomer (I) to have smaller n and m in the general formula (I) because the resulting copolymer has a higher refractive index. On the other hand, the compatibility of the monomer (I) with the second monomer copolymerized with the monomer (I) becomes better as the sum of n and m increases. Accordingly, a monomer of the formula (I) in which the sum of n and m ranges from 0 to 4 is used as the monomer (I) in the present invention. If the sum of n and m exceeds 4, it is impossible to impart any sufficiently high refractive index to a copolymer to be obtained eventually.

As specific examples of the monomer (I) represented by the general formula (I), may be mentioned:
2-(4-hydroxy-3,5-dibromophenyl)-2-(4-methacryloxy-3,5-dibromophenyl)propane,
2-(4-hydroxyethoxy-3,5-dibromophenyl)-2-(4-methacryloxyethoxy-3,5-dibromophenyl)propane,
2-(4-hydroxyethoxy-3,5-dibromophenyl)-2-(4-acryloxyethoxy-3,5-dibromophenyl)propane,
2-(4-hydroxy-3,5-dibromophenyl)-2-(4-acryloxy-3,5-dibromophenyl)propane,
2-(4-hydroxydiethoxy-3,5-dibromophenyl)-2-(4-methacryloxydiethoxy-3,5-dibromophenyl)propane,
2-(4-hydroxydiethoxy-3,5-dibromophenyl)-2-(4-acryloxydiethoxy-3,5-dibromophenyl)propane; and mixtures thereof.

The above compounds are merely illustrative examples which may be used as the monomer (I) in the present invention. This invention should therefore not be limited to the use of such exemplary compounds.

The copolymer of this invention is obtained by using the monomer (I) in a proportion of 10-80 wt. % of the whole monomers and the second monomer copolymerizable with the monomer (I) in a proportion of 20-90 wt. % and then copolymerizing them with each other. If the proportion of the monomer (I) is smaller than 10 wt. %, there is a possible problem that a plastic lens to be obtained eventually would not have any high refractive index. If this proportion exceeds 80 wt. % on the contrary, the resulting copolymer has poor resistance to organic solvents. Since the monomer (I) is generally in a solid form, such an unduly large proportion of the monomer (I) renders the handling of the reaction mixture difficult upon production of a plastic lens by casting polymerization or the like. Therefore, the proportion of the monomer (I) may be set preferably within a range of from 20 wt. % to 65 wt. %.

The monomer (I) is copolymerized with the second monomer copolymerizable with the former monomer (said latter monomer will hereinafter be called "copolymerizable monomer"). The plastic lens of this invention is obtained from the resulting copolymer. Owing to the copolymerization of the copolymerizable monomer with the monomer (I), it is possible to obtain a copolymer which satisfies various properties required for plastic lenses, especially, the requirements for a high refractive index and good dyeability. In order to obtain a plastic lens having a refractive index $n_D^{20}$ of 1.58 or higher in accordance with this invention, it is only necessary to choose the kind and proportion of the copolymerizable monomer, which is to be used, in accordance with the kind and proportion of the monomer (I) to be used. As the copolymerizable monomer, it is preferable to use such a copolymerizable monomer that gives a refractive index of at least 1.53 when polymerized into a homopolymer, because the use of such a copolymerizable monomer facilitates to impart a refractive index of 1.58 or higher to the copolymer to be obtained eventually.

As specific examples of such a copolymerizable monomer, may be mentioned:
(1) Alkyl (meth)acrylates:
Methyl acrylate, methyl methacrylate, naphthyl acrylate, naphthyl methacrylate, phenyl acrylate, phenyl methacrylate, trimethylolpropane triacrylate, trimethylolpropane trimethacrylate, ethyleneglycol diacrylate, ethyleneglycol dimethacrylate, tribromophenyl acrylate, tribromophenyl methacrylate, 2,2-bis-(4-acryloxyethoxy-3,5-dibromophenyl)propane, 2,2-bis-(4-methacryloxy-ethoxy-3,5-dibromophenyl)propane, 2,2-bis-(4-acryloxy-3,5-dibromophenyl)propane, 2,2-bis-(4-methacyloxy-3,5-dibromophenyl)propane, 2,2-bis-(4-methacryloxyphenyl)-propane, 2,2-bis-(4-acryloxyethoxyphenyl)propane, etc.

(2) Aromatic vinyl compounds:
Styrene, α-methylstyrene, divinylbenzene, vinylnaphthalene, m-diisopropenylbenzene, 2-isopropenylnaphthalene, etc.

(3) Allyl compounds:
Triallyl isocyanurate, diallyl phthalate, etc.

The copolymerizable monomers referred to above are merely illustrative monomers usable as copolymerizable monomers in the present invention. It should therefore be borne in mind that the present invention is not limited to their use.

In addition, it is also extremely meaningful to use these copolymerizable monomer in combination instead of employing them singly. Since the abovedescribed monomer (I) contains only one ethylenically-unsaturated polymerizable bond, it is preferable to use, as the copolymerizable monomer, a polyfunctional polymerizable monomer containing plural ethylenically-unsaturated polymerizable bonds, in other words, a copolymerizable monomer which may generally be called "a crosslinking agent". In this case, the resultant copolymer has a crosslinked structure so that the solvent resistance can be improved to a considerable extent.

These copolymerizable monomers are used in a proportion ranging from 20 wt. % to 90 wt. % depending on the application purpose of a plastic lens to be obtained, with a proportion of 35-80 wt. % being particularly preferred.

The copolymerization reaction between the monomer (I) and copolymerizable monomer proceeds in the presence of an ordinary radical polymerization initiator. Their polymerization may be carried out by using a method employed for usual radial polymerization without any modification. Where a polyfunctional monomer is used as the copolymerizable monomer, the resulting copolymer has a crosslinked structure. Therefore, it is impossible as a matter of fact to subject the copolymer to a step in which melting or dissolution is performed. Generally, it is hence preferable to produce plastic lenses by casting polymerization.

Casting polymerization is a well-known technique. As vessels for casting polymerization, it is possible to use molds or frames of a plate-like, lens-like, cylindrical, block-like, conical or spherical shape or of any other shape designed in accordance with each application purpose. The molds or frames may be made of any material conforming with their purpose, such as inorganic glass, plastics or metal. In general, a mixture of the monomer composition and an initiator is subjected to a polymerization reaction within such a container, optionally, by heating them. As an alternative, the polymerization may also be carried out by pouring a prepolymer or syrup, which has been obtained in advance by conducting the polymerization to a certain extent in a separate container, into a polymerization vessel and then proceeding further with the polymerization until it completes.

In the polymerization reaction, the monomers and initiator used may be mixed at once in their entirety or stepwise in portions. The thus-obtained mixture may also contain an antistatic agent, heat stabilizer, ultraviolet absorbent, antioxidant and other auxiliary materials in accordance with the intended application field of a copolymer to be obtained. Needless to say, post treatments such as heating and annealing may be applied to the thus-obtained copolymer for such purposes as ensuring the completion of the polymerization, enhancing the surface hardness and eliminating strains developed internally during the casting polymerization.

As in the conventional plastic lenses, the plastic lens of this invention may be produced directly from the monomer composition by casting polymerization or as an alternative, may be produced by obtaining a copolymer in a shape other than lens shapes, such as a plate-like shape and then cutting and if necessary, applying finish processing such as surface polishing.

Since the plastic lens of this invention is made of the copolymer which contains the monomer (I) as an essential component, it has a high refractive index and good dyeability and also permits easy dyeing. The dyeing can be performed in a manner known commonly in the art, namely, by dipping the plastic lens at room temperature or under heating in a solution of a water-soluble dye of a desired color or in a dispersion of a water-dispersible dye of a preferred color. The intensity of the color may be changed by adjusting the temperature, concentration of the solution or dispersion of the dye and/or the dipping time.

In order to enhance the surface hardness of the plastic lens of this invention, a surface-hardening layer may be formed on the plastic lens by coating it with a silicone-base hard coating formulation or a u.v. curable organic hard coating formulation. It is of course possible to form an antireflection coating of a metal oxide or fluoride by vacuum deposition, sputtering or a similar technique and further to apply other so-called secondary lens processing.

Examples of this invention will hereinafter be described. It should however be borne in mind that this invention is by no means limited to or by the following Examples.

EXAMPLE 1

| | wt. parts |
|---|---|
| 2-(4-Hydroxy-3,5-dibromophenyl)-2-(4-methacryloxy-3,5-dibromophenyl)-propane | 30 |
| 2,2-Bis-(4-methacryloxy-3,5-dibromophenyl)propane | 30 |
| Styrene | 40 |

The above materials were added with 0.5 part by weight of an ultraviolet absorbent "Tinuvin 328" (trade name; product of Ciba-Geigy AG), 0.5 part by weight of an antioxidant "Irganox 245" (trade name; product of Ciba-Geigy AG) and 1 part by weight of lauroyl peroxide as an initiator, thereby obtaining a mixture.

The mixture was charged into a glass mold. After deaerating the mold thoroughly and substituting the internal atmosphere of the mold with nitrogen gas, the monomers were reacted at varied temperatures, namely, at 50° C. for 2 hours, at 60° C. for 15 hours, at 80° C. for 2 hours and at 100° C. for 1 hour, whereby their polymerization was completed to produce a plastic lens according to this invention.

The plastic lens was substantially colorless. When a laser beam of 1 mW energy obtained from a laser oscillator "GLG 5090" (trade name; manufactured by NEC CORP.) was caused to transmit through the plastic lens, substantially no scattering was observed. It was hence recognized to have excellent transparency and low dispersiveness. In addition, the plastic lens was absolutely insoluble in organic solvents such as ethanol, acetone, methyl ethyl ketone, tetrahydrofuran and toluene, thereby indicating a three-dimensional crosslinked structure.

Further, the refractive index and Abbe number of the plastic lens were measured at 20° C. by an Abbe's refractometer. The following results were obtained.

Refractive index, $n_D^{20}$: 1.610

Abbe number, $\nu$: 31.0

As is apparent from the above results, the plastic lens had the high refractive index and excellent optical properties. When the plastic lens was dipped at 98° C. in a 0.7% aqueous solution of a brown dye "NIKON LIGHT" (trade mark; product of NIPPON KOGAKU K.K.), the plastic lens was dyed successfully in a brown color.

After subjecting the surfaces of the plastic lens to an alkali treatment, the surfaces of the plastic lens were coated with a commercial siliconebase hard coating formulation by a dipping method to apply a hard coat treatment. The surface hardness of the resulting plastic lens was very high, namely, 3 H. In addition, the adhesion of the hard coat layers to the lens substrate was also sufficient so that no separation of the hard coat layers was observed at all in a cross-hatching test making use of an adhesive cellophane tape.

As has been demonstrated above, the plastic lens material of this invention is also superb in the drape by hard coat layers.

COMPARATIVE EXAMPLE 1

Dissolved and mixed in 400 parts by weight of acetone were 82 parts by weight of 2-(4-hydroxy-3,5-dibromophenyl)-2-(4-methacryloxy-3,5-dibromophenyl)-propane and 18 parts by weight (equivalent to 0.5 mole of the bromine-containing compound) of isophorone diisocyanate, followed by an addition of 0.25 part by weight of di-n-butyltin dilaurate as a catalyst. The monomers were caused to undergo a urethane reaction at 60° C. Acetone was completely evaporated from the resultant mixture, thereby obtaining a polymerizable urethane compound.

A mixture was then obtained by combining 30 parts by weight of the above urethane compound, 30 parts by weight of 2,2-bis-(4-methacryloxy-3,5-dibromophenyl)-propane, 40 parts by weight of styrene, 0.5 part by weight of the ultraviolet absorbent "Tinuvin 328", 0.5 part by weight of the antioxidant "Irganox 245" and 1 part by weight of lauroyl peroxide as an initiator.

The mixture was charged into a glass mold. After deaerating the mold thoroughly and substituting the internal atmosphere of the mold with nitrogen gas, the monomers were reacted at varied temperatures, namely, at 50° C. for 2 hours, at 60° C. for 15 hours, at 80° C. for 2 hours and at 100° C. for 1 hour, whereby their polymerization was completed to produce a plastic lens for the sake of comparison.

The plastic lens was slightly tinged in a yellow color. When a laser beam was caused to transmit therethrough in the same manner as in Example 1, scattering was observed albeit a little.

Further, the refractive index and Abbe number of the plastic lens were measured at 20° C. in the same manner as in Example 1. The following results were obtained.

Refractive index, $n_D^{20}$: 1.602

Abbe number, $\nu$: 30.6

In addition, the comparative plastic lens was dipped in a dyeing solution in the same manner as in Example 1. It was however practically impossible to dye the comparative plastic lens.

From the foregoing, it is apparent that the plastic lens of Example 1 has high dyeability owing to the inclusion of phenolic hydroxyl groups and its optical properties are also superb.

EXAMPLE 2

|  | wt. parts |
| --- | --- |
| 2-(4-Hydroxyethoxy-3,5-dibromophenyl)-2-(4-methacryloxyethoxy-3,5-dibromophenyl)propane purified thoroughly by column chromatography | 40 |
| Styrene | 50 |
| α-Methylstyrene | 10 |

The above materials were added with 0.5 part by weight of the ultraviolet absorbent "Tinuvin 328", 0.5 part by weight of the antioxidant "Irganox 245" and 1 part by weight of lauroyl peroxide as an initiator, thereby obtaining a mixture.

The mixture was charged into a glass mold. After deaerating the mold thoroughly and substituting the internal atmosphere of the mold with nitrogen gas, the monomers were reacted at varied temperatures, namely, at 50° C. for 4 hours, at 60° C. for 15 hours, at 80° C. for 3 hours and at 100° C. for 2 hours, whereby their polymerization was completed to produce a plastic lens according to this invention.

The plastic lens was substantially colorless. When a laser beam was caused to transmit therethrough in the same manner as in Example 1, substantially no scattering was observed. It was hence recognized to have excellent transparency and low dispersiveness.

Further, the refractive index and Abbe number of the plastic lens were measured at 20° C. in the same manner as in Example 1. The following results were obtained.

Refractive index, $n_D^{20}$: 1.598

Abbe number, $\nu$: 31.2

As is apparent from the above results, the plastic lens had the high refractive index and excellent optical properties. When the plastic lens was dipped at 90° C. for 1 hour in a 0.15% aqueous solution of a blue dye "Sumikaron Blue E-FBL" (trade name; product of SUMITOMO CHEMICAL CO., LTD.), the plastic lens was dyed successfully in a vivid blue color.

COMPARATIVE EXAMPLE 2

|  | wt. parts |
| --- | --- |
| 2,2-Bis-(4-methacryloxyethoxy-3,5-dibromophenyl)propane | 40 |
| Styrene | 50 |
| α-Methylstyrene | 10 |

The above materials were added with 0.5 part by weight of the ultraviolet absorbent "Tinuvin 328", 0.5 part by weight of the antioxidant "Irganox 245" and 1 part by weight of lauroyl peroxide as an initiator, thereby obtaining a mixture.

The mixture was charged into a glass mold. After deaerating the mold thoroughly and substituting the internal atmosphere of the mold with nitrogen gas, the monomers were reacted at varied temperatures, namely, at 50° C. for 4 hours, at 60° C. for 15 hours, at 80° C. for 3 hours and at 100° C. for 2 hours, whereby their polymerization was completed to produce a plastic lens for the sake of comparison.

The plastic lens was substantially colorless. When a laser beam was caused to transmit therethrough in the same manner as in Example 1, substantially no scattering was observed. Further, the refractive index and Abbe number of the plastic lens were measured at 20° C. in the same manner as in Example 1. The following results were obtained.

Refractive index, $n_D^{20}$: 1.586

Abbe number, $\nu$: 30.2

In addition, the comparative plastic lens was dipped in a dyeing solution in the same manner as in Example 2. It was however practically impossible to dye the comparative plastic lens.

From the foregoing, it is apparent that the plastic lens of Example 2 has high dyeability owing to the inclusion of hydroxyethoxy groups and its optical properties are also superb.

COMPARATIVE EXAMPLE 3

|  | wt. parts |
| --- | --- |
| 2,2-Bis-(4-methacryloxyethoxy-3,5-dibromophenyl)propane | 40 |
| Styrene | 25 |
| α-Methylstyrene | 10 |

| | wt. parts |
|---|---|
| 2-Hydroxyethyl methacrylate | 25 |

A plastic lens was produced in the same manner as in Comparative Example 2 except for the use of the above monomer composition.

Further, the refractive index and Abbe number of the plastic lens were measured at 20° C. in the same manner as in Example 1. The following results were obtained.

Refractive index, $n_D^{20}$: 1.566
Abbe number, $\nu$: 35.1

The plastic lens was dipped in a dyeing solution in the same manner as in Example 2. It was however possible to dye it only slightly. The dyeability of the plastic lens was hence inferior to the plastic lens of Example 2.

In Comparative Example 3, 2-hydroxyethyl methacrylate was used as a monomer component. This compound is commonly employed to obtain plastic lenses having good dyeability. It contains an aliphatic hydroxyl group. The refractive index of the resultant plastic lens was however much lower compared with the plastic lens of Example 2 which relates to the present invention. It is hence apparent that high refractive index and excellent dyeability can be both obtained from the use of the monomer (I).

EXAMPLE 3

| | wt. parts |
|---|---|
| 2-(4-Hydroxyethoxy-3,5-dibromo-phenyl)-2-(4-methacryloxyethoxy-3,5-dibromophenyl)propane purified thoroughly by column chromatography | 30 |
| Divinylbenzene | 20 |
| Styrene | 40 |
| α-Methylstyrene | 10 |

The above materials were added with 0.5 part by weight of the ultraviolet absorbent "Tinuvin 328", 0.5 part by weight of the antioxidant "Irganox 245" and 1 part by weight of lauroyl peroxide as an initiator, thereby obtaining a mixture.

The mixture was charged into a glass mold. After deaerating the mold thoroughly and substituting the internal atmosphere of the mold with nitrogen gas, the monomers were reacted at varied temperatures, namely, at 40° C. for 4 hours, at 50° C. for 15 hours, at 60° C. for 5 hours, at 80° C. for 3 hours and at 100° C. for 2 hours, whereby their polymerization was completed to produce a plastic lens according to this invention.

The plastic lens thus obtained was substantially colorless. When a laser beam was caused to transmit therethrough in the same manner as in Example 1, substantially no scattering was observed. It was hence recognized to have excellent transparency. In addition, the plastic lens was absolutely insoluble in organic solvents such as ethanol, acetone, methyl ethyl ketone, tetrahydrofuran and toluene, thereby indicating a three-dimensional crosslinked structure.

Further, the refractive index and Abbe number of the plastic lens were measured at 20° C. in the same manner as in Example 1. The following results were obtained.

Refractive index, $n_D^{20}$: 1.601
Abbe number, $\nu$: 30.1

As is apparent from the above results, the plastic lens also allowed to use a crosslinkable monomer such as divinylbenzene as a component and had excellent optical properties, especially, the high refractive index.

When the plastic lens was dipped at 90° C. for 1 hour in a 0.15% aqueous solution of the same dye as that employed in Example 2, i.e., "Sumikaron Blue E-FBL", the plastic lens was dyed successfully in a vivid blue color.

We claim:

1. A plastic lens made of a copolymer which has been obtained by copolymerizing 10–80 wt. % of a first monomer represented by the general formula (I) given below and 20–90 wt. % of a second monomer copolymerizable with the first monomer; General formula (I):

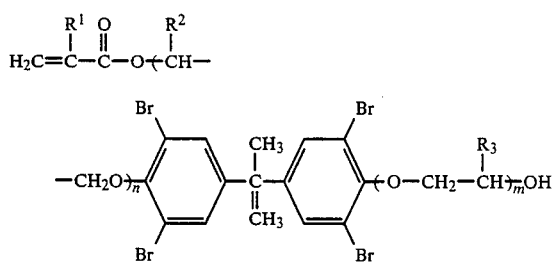

wherein $R^1$, $R^2$ and $R^3$ mean individually a hydrogen atom or methyl group, and n and m denote integers of 0–4 in total.

2. The plastic lens as claimed in claim 1, wherein the plastic lens has a refractive index of at least 1.58.

3. The plastic lens as claimed in claim 1, wherein the second monomer is a monomer capable of providing a homopolymer whose refractive index is at least 1.53.

4. The plastic lens as claimed in claim 1, wherein the proportion of the first monomer is 20–65 wt. % while that of the second monomer is 35–80 wt. %.

5. The plastic lens as claimed in claim 1, wherein the second monomer is at least one monomer selected from the group consisting of alkyl acrylates, alkyl methacrylates, aromatic vinyl compounds and allyl compounds.

6. The plastic lens as claimed in claim 1, wherein the second monomer is polyfunctional and the copolymer has a crosslinked structure.

7. The plastic lens as claimed in claim 1, wherein the plastic lens has been dyed with a dye.

* * * * *